United States Patent [19]

Tanimizu

[11] Patent Number: 4,954,880

[45] Date of Patent: Sep. 4, 1990

[54] COLOR DISPLAY APPARATUS

[75] Inventor: Akihiro Tanimizu, Nagaokakyo, Japan

[73] Assignee: Mitsubishi Denki Kabushiki Kaisha, Tokyo, Japan

[21] Appl. No.: 209,832

[22] Filed: Jun. 22, 1988

[30] Foreign Application Priority Data

Jun. 25, 1987 [JP] Japan .............................. 62-97716[U]

[51] Int. Cl.⁵ .............................................. H04N 5/04
[52] U.S. Cl. ...................................... 358/17; 358/148; 358/181
[58] Field of Search ................. 358/148, 22, 183, 181, 358/242, 153, 150, 21 R, 17; 340/814

[56] References Cited

U.S. PATENT DOCUMENTS 4,460,918  7/1984  Flaza ..................................... 358/22
4,709,267 11/1987  Sendelweck ......................... 358/148

Primary Examiner—Edward L. Coles, Sr.
Assistant Examiner—David E. Harvey
Attorney, Agent, or Firm—Fleit, Jacobson, Cohn, Price, Holman & Stern

[57] ABSTRACT

A color display apparatus has interfaces for two types of inputs: in one the synchronizing pulses are separate from the video signals; in the other they are superimposed. A sync pulse detecting means selects the correct interface automatically, obviating the need for a manual switch.

9 Claims, 4 Drawing Sheets

COLOR DISPLAY APPARATUS

BACKGROUND OF THE INVENTION

This invention relates to a color display apparatus, more particularly to a color display apparatus with two interfaces.

It is common for the color displays connected to personal computers and similar equipment to receive red, green, and blue video signals on separate signal lines. The method of input of the horizontal and vertical synchronizing pulses, however, has not been standardized. In one system two additional signal lines are provided for input of these synchronizing pulses. In another system the synchronizing pulses are superimposed on one or more of the red, green, and blue video signals. The first system will be called the separate-sync system; the second system will be called the superimposed-sync system.

The two systems require different signal processing circuits in the color display apparatus. A signal processing circuit for the superimposed-sync system must be able to extract the synchronizing pulses from the video input. A signal processing circuit for the separate-sync system must be able to receive the synchronizing pulses via separate signal lines. To provide compatibility with both systems, some color displays incorporate both types of signal processing circuits. These color displays customarily have a manual switch for selecting one of the two signal processing circuits and disabling the other, so that electrical noise at the input terminals for the unused circuit will not interfere with the display.

A manual switch capable of switching high-frequency video signals, however, adds significantly to the cost of the color display apparatus. Furthermore, it is inconvenient for the user to have to set the switch when connecting the display, and if the switch is set to the wrong position by mistake, the display will not work.

SUMMARY OF THE INVENTION

A color display apparatus according to this invention comprises
- a set of input terminals for receiving a first input comprising red, green, and blue video inputs and horizontal and vertical synchronizing pulses separated from the video inputs and a second input comprising red, green, and blue video inputs on one or more of which the horizontal and vertical synchronizing pulses are superimposed,
- a separate-sync signal processing circuit for processing said first input,
- a superimposed-sync signal processing circuit for processing said second input,
- a detecting means for detecting whether or not the holizontal and vertical synchronizing pulses are superimposed on said video inputs and generating a switching signal,
- a switching means for receiving said switching signal and selecting one of said separate-sync signal processing circuit and said superimposed-sync signal processing circuit, and
- a color display for receiving outputs from said separate-sync signal processing circuit or said superimposed-sync signal processing circuit, and displaying an image.

An object achieved by this invention is to select the correct signal processing circuit automatically without the need for a manual switch.

DETAILED DESCRIPTION OF THE PREFERRED EMBODIMENTS

Figure 1:
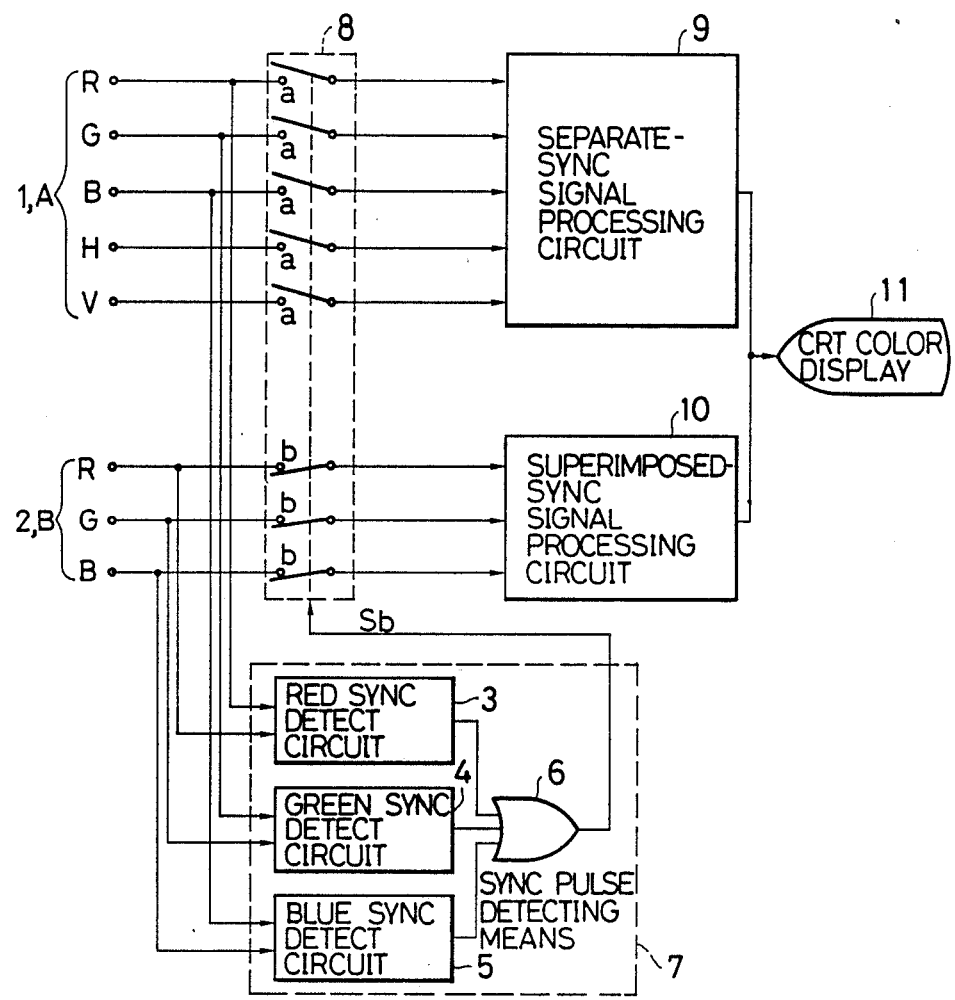
FIG. 1 is a block diagram of a color display apparatus according to this invention.

An embodiment of this invention will be described with reference to the block diagram in FIG. 1. The color display apparatus shown in FIG. 1 can receive inputs from two sets of input terminals: a first set of input terminals 1 receives an input A with separate signal lines for the synchronizing pulses; a second set of input terminals 2 receives an input B in which the synchronizing pulses are superimposed on one or more of the video signals. The red(R), green(G), and blue(B) video inputs from both sets of terminals are connected to a bank of three sync detect circuits 3, 4, and 5 which determine whether or not horizontal and vertical synchronizing pulses are superimposed on these video signals. Each sync detect circuit generates an output signal that is True if superimposed synchronizing pulses are detected and False if they are not. The outputs of the three sync detect circuits 3, 4, and 5 are coupled to an OR gate 6 which generates a True switching signal Sb when it receives a True sync detect signal from any of the sync detect circuits 3, 4, and 5. The three sync detect circuits 3, 4, and 5 and the OR gate 6 form a sync pulse detecting means 7. The switching signal Sb is applied to an input switching circuit 8 which operates as follows.

The input switching circuit 8 has two sets of input terminals: one marked "a" for receiving the separate-sync input A from the first set of input terminals 1; and another marked "b" for receiving the superimposed-sync input B from the second set of input terminals 2. When the switching signal Sb is False, the terminals "a" are coupled through the input switching circuit 8 to a separate-sync signal processing circuit 9, and the terminals "b" are disconnected. When the switching signal Sb is True, the terminals "b" are coupled through the input switching circuit 8 to a superimposed-sync signal processing circuit 10, and the terminals "a" are disconnected, as shown in the drawing.

The outputs of the separate-sync signal processing circuit 9 and superimposed-sync signal processing circuit 10 are both connected to a CRT color display 11. The separate-sync signal processing circuit 9 performs signal processing appropriate to the separate-sync input A and displays an image on the CRT color display 11. The superimposed-sync signal processing circuit 10 performs processing appropriate to the superimposed-sync input B and displays an image on the CRT color display 11.

When a device that is connected to the first set of input terminals 1 and generates a separate-sync input A, is activated, the input A is applied to the terminals 1.

The video signals in this input A contain no superimposed synchronizing pulses, so none of the sync detect circuits 3, 4, and 5 produces a True sync detect signal. The output from the OR gate 6 is therefore False, so the input switching circuit 8 is connected at "a" and disconnected at "b." The input A is thus coupled to the separate-sync signal processing circuit 9 and correctly processed, and an image is displayed on the CRT color display 11.

When a device that is connected to the second set of input terminals 2 and generates a superimposed-sync input B, is activated, the input B is applied to the terminals 2. At least one of the video signals in the input B has superimposed synchronizing pulses, so at least one of the sync detect circuits 3, 4, and 5 produces a True sync detect signal. The output from the OR gate 6 is therefore True, so the input switching circuit 8 is connected at "b" and disconnected at "a." The input B is thus coupled to the superimposed-sync signal processing circuit 10 and correctly processed, and an image is displayed on the CRT color display 11.

Consequently, regardless of which type of input the color display apparatus receives, the correct signal processing circuit is selected automatically without the need for the user to set a manual switch.

Figure 2:
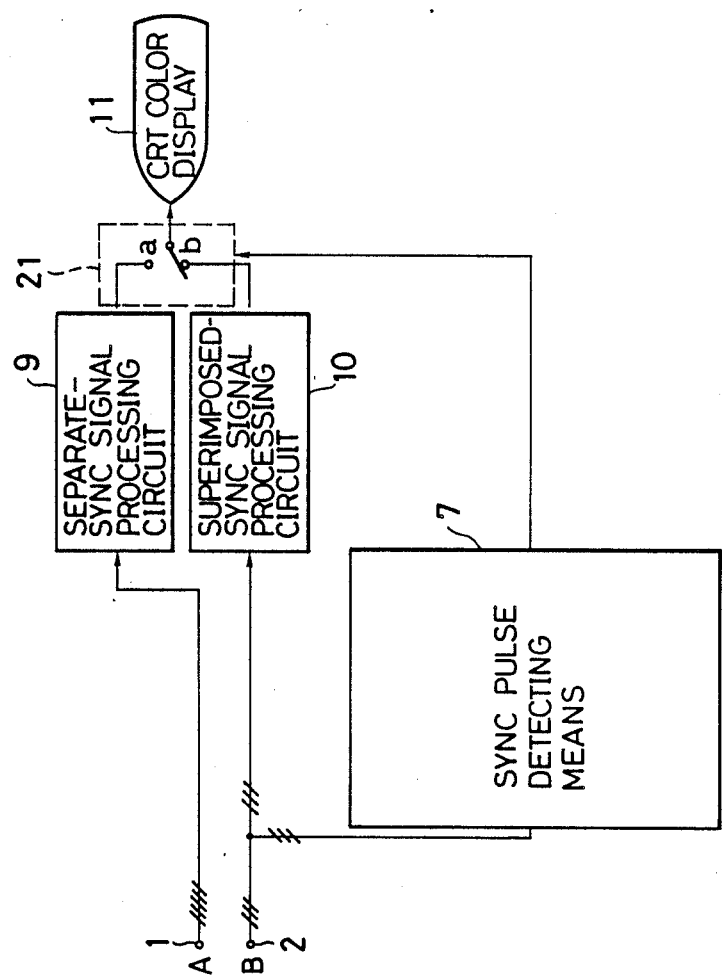
FIG. 2 is a block diagram of a color display apparatus according to a second embodiment of this invention.

FIG. 2 shows a second embodiment of this invention. In this embodiment, only the input B is applied to the sync pulse detecting means 7, because the R, G and B video inputs from the terminals 1 contain no superimposed synchronizing pulses and the sync pulse detecting means 7 never detects the superimposed synchronizing pulses from the R, G and B video signals input from the terminals 1. Furthermore, in this embodiment, the output from the sync pulse detecting means 7 controls an output switching circuit 21 so that it is connected at "b" by True sync detect signal and at "a" by False sync detect signal, respectively. In a further modification, only the R, G and B video inputs of the input A may be applied to the detecting circuit means 7. In this case the detecting means 7 should comprise circuits which detect that the R, G and B video inputs do not contain superimposed synchronizing pulses.

Figure 3:
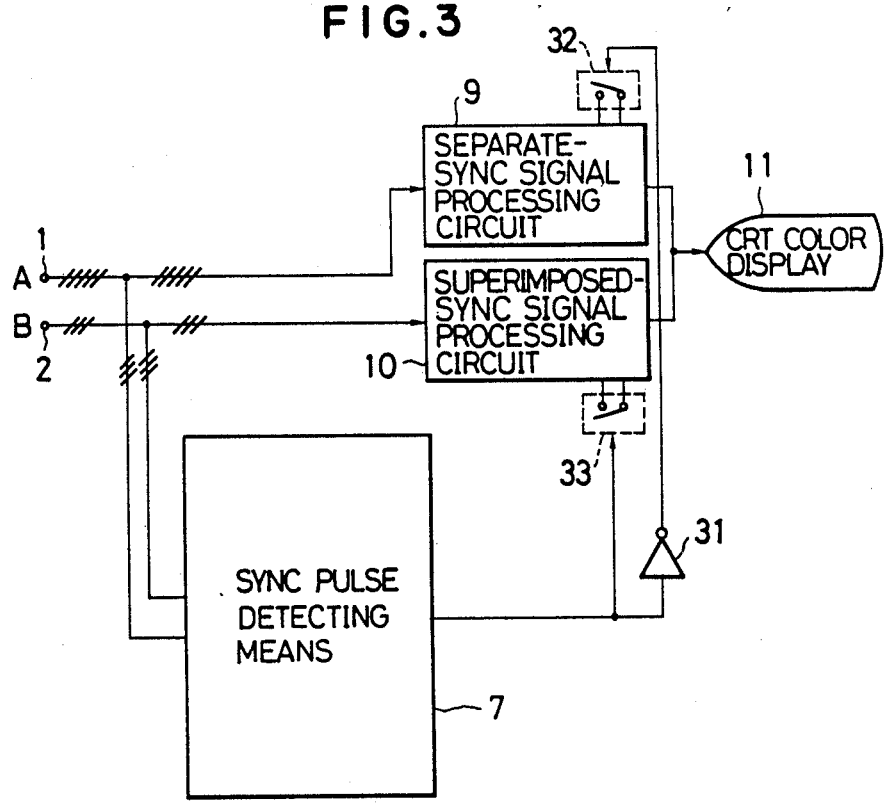
FIG. 3 is a block diagram of a color display apparatus according to a third embodiment of this invention.

FIG. 3 shows a third embodiment. In this embodiment, the output from the sync pulse detecting means 7 is applied directly to a switching circuit 33 of the superimposed-sync signal processing circuit 10 and through an inverter 31 to a switching circuit 32 of the separate-sync signal processing circuit 9. The switching circuits 32 and 33 are switched on and off by the True sync detect signal and False sync detect signal, respectively. The signal processing circuits 9 and 10 are activated in accordance with the switching states of the switching circuits 32 and 33.

Figure 4:
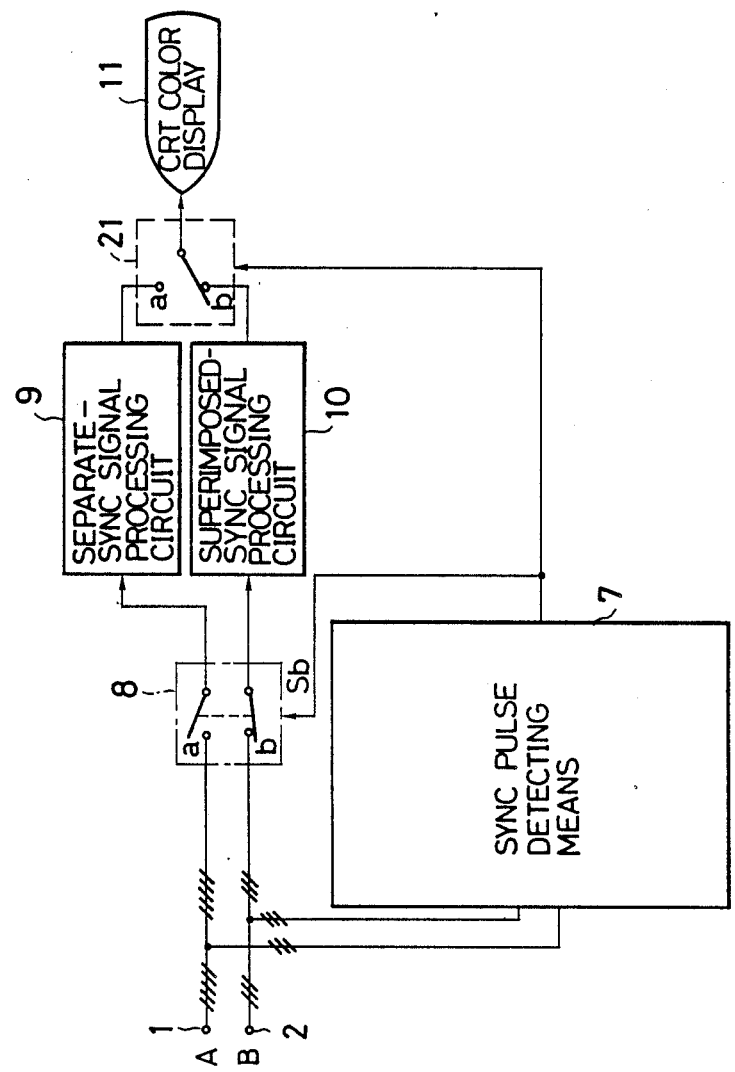
FIG. 4 is a block diagram of a color display apparatus according to a fourth embodiment of this invention.

FIG. 4 is a block diagram of a forth embodiment. In this embodiment, the input switching circuit 8 and the output switching circuit 21 are located on the input and output sides of the signal processing circuits 9 and 10, respectively.

Figure 5:
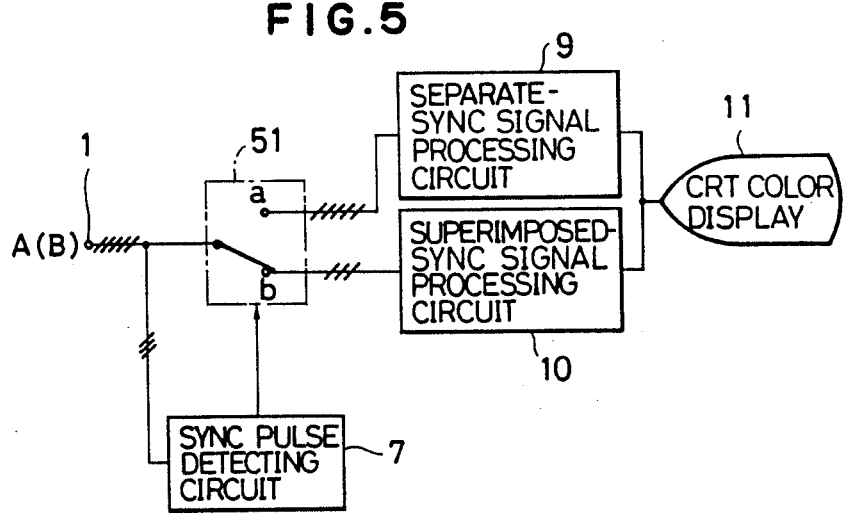
FIG. 5 is a block diagram of a color display apparatus according to a fifth embodiment of this invention.

FIG. 5 shows a fifth embodiment. In this embodiment, the R, G and B signal lines are shared between the inputs A and B. With this embodiment, either one of a device that generates a separate-sync input A and a device that generates a superimposed-sync input B can be connected to the terminals 1 at a time. When the sync pulse detecting means 7 produces the False sync detect signal, an input switching circuit 51 is connected at "a" and the R, G and B video signals and the horizontal and vertical synchronizing pulses are applied to the separate-sync signal processing circuit 9. When the sync pulse detecting means 7 generates the True sync detect signal, the input switching circuit 51 is connected at "b" and the R, G and B video signals are applied to the superimposed-sync signal processing circuit 10.

What is claimed is:

1. A color display apparatus comprising:
a first set of a plurality of input terminals for receiving a first set of video signals comprising red, green, and blue video signals, each of said video signals of said first set being applied to a distinct terminal of said first set of input terminals, and for receiving horizontal and vertical synchronizing signals, each of said horizontal and said vertical synchronizing signals being applied to a distinct one of said first set of input terminals, and a second set of a plurality of input terminals for receiving a second set of video signals comprising red, green, and blue video signals, each of said video signals being applied to a distinct terminal of said second set of input terminals, one or more of said video signals of said second set being superimposed with horizontal and vertical synchronizing signals,
a separate-sync signal processing circuit for processing the signals on said first set of input terminals,
a superimposed-sync signal processing circuit for processing said signals on said second set of input terminals,
a detecting means for detecting the presence or absence of superimposed horizontal and vertical synchronizing signals on at least one of said second set of video signals and generating a switching signal,
a switching means for receiving said switching signal and selecting one of said separate-sync signal processing circuit and said superimposed-sync signal processing circuit for processing either said first set of video signals or said second set of video signals, respectively, and
a color display for receiving said first set of video signals or said second set of video signals from either said separate-sync signal processing circuit or said superimposed-sync signal processing circuit, respectively, and displaying an image.

2. A color display apparatus according to claim 1, in which said switching means is interposed between said first and second sets of input terminals and said separate-sync and superimposed-sync signal processing circuits.

3. A color display apparatus according to claim 1, in which said switching means is interposed between said separate-sync and superimposed-sync signal processing circuits and said color display.

4. A color display apparatus according to claim 1, in which said switching means is located in said separate-sync and superimposed-sync signal processing circuits.

5. A color display apparatus according to claim 1, and further including input terminals for providing said first and second sets of video signals to said first and second sets of input terminals.

6. A color display apparatus according to claim 1, in which said detecting means receives said video signals of said first set of input terminals.

7. A color display apparatus according to claim 1, in which said detecting means receives said second set of video signals of said second set of input terminals.

8. A color display apparatus according to claim 1, in which said detecting means comprises:

red, green, and blue sync detect circuits for receiving the red, green and blue video signals of at least one of said first and second input terminals, for detecting the presence or absence of synchronizing signals superimposed on the video signals received by the detect circuits, and generating a detect output signal; and an OR gate for receiving the sync detect outputs of said red, green, and blue sync detect circuits and generating the switching signal.

9. A color display apparatus according to claim 8, in which said red, green, and blue sync detect circuits receive said red, green, and blue video signals of second set of input terminals and generate a True sync detect signal when said superimposed synchronizing pulses are detected.

* * * * *